United States Patent
Roy et al.

(10) Patent No.: US 11,611,446 B2
(45) Date of Patent: Mar. 21, 2023

(54) INTERMEDIARY DEVICE FOR DAISY CHAIN AND TREE CONFIGURATION IN HYBRID DATA/POWER CONNECTION

(71) Applicant: GENETEC INC., Montreal (CA)

(72) Inventors: Danny Roy, Montreal (CA);
Louis-Philippe Brais, Montreal (CA);
Benoit Lemieux, Montreal (CA);
Jean-Yves Pikulik, Montreal (CA)

(73) Assignee: Genetec Inc., Montreal (CA)

( * ) Notice: Subject to any disclaimer, the term of this patent is extended or adjusted under 35 U.S.C. 154(b) by 110 days.

(21) Appl. No.: 16/879,631

(22) Filed: May 20, 2020

(65) Prior Publication Data

US 2021/0091966 A1 Mar. 25, 2021

Related U.S. Application Data

(60) Provisional application No. 63/027,195, filed on May 19, 2020, provisional application No. 62/904,852, filed on Sep. 24, 2019.

(51) Int. Cl.
*H04L 12/10* (2006.01)
*H04L 49/00* (2022.01)

(52) U.S. Cl.
CPC .............. *H04L 12/10* (2013.01); *H04L 49/30* (2013.01)

(58) Field of Classification Search
CPC .................................. H04L 12/10; H04L 49/30
See application file for complete search history.

(56) References Cited

U.S. PATENT DOCUMENTS

| | | | | |
|---|---|---|---|---|
| 1,022,847 A | * | 4/1912 | Jaccard | A63F 7/3622 273/120 R |
| 1,655,904 A | * | 1/1928 | Hott | H01B 7/368 40/666 |
| 2,859,706 A | * | 11/1958 | Talboys | B60B 17/00 104/8 |
| 7,085,875 B1 | * | 8/2006 | Yona | G06F 13/409 710/316 |

(Continued)

FOREIGN PATENT DOCUMENTS

| | | | | |
|---|---|---|---|---|
| CA | 2859706 A1 | * | 6/2013 | ............. B01D 11/04 |
| CA | 2859706 C | * | 1/2020 | ............. B01D 11/04 |

(Continued)

OTHER PUBLICATIONS

Bidirectional Power over Ethernet, published on Dec. 27, 2019 by All, Energy Harvesting, IoT, Power (Charles Byers), 4 pages.

(Continued)

*Primary Examiner* — Berhanu Tadese

(57) ABSTRACT

A plurality of intermediary devices may be interposed in a hybrid data/power connection between a power source and a powered device. In one aspect, the intermediary devices may be connected in series. Such connecting may be referred to as "daisy chaining." In other aspects, the intermediary devices may be connected in a tree or a mesh. Each intermediary device may be configured to consume, for its own use, power that is supplied over the hybrid data/power connection and to deliver remaining power over the hybrid data/power connection to at least one other device. Furthermore, each intermediary device may be configured to independently route data and power to downstream devices.

27 Claims, 9 Drawing Sheets

(56) References Cited

U.S. PATENT DOCUMENTS

| | | | | |
|---|---|---|---|---|
| 7,240,224 B1* | 7/2007 | Biederman | G06F 1/266 | 713/340 |
| 7,363,525 B2* | 4/2008 | Biederman | G06F 1/266 | 714/21 |
| 7,483,383 B2* | 1/2009 | Santoso | H04L 49/55 | 370/255 |
| 7,579,809 B2* | 8/2009 | Bowles | H02J 7/00 | 320/112 |
| 7,630,299 B2* | 12/2009 | Magret | H04L 45/60 | 370/219 |
| 7,836,336 B2* | 11/2010 | Biederman | H04L 12/10 | 714/14 |
| 8,098,571 B2* | 1/2012 | Santoso | H04L 45/00 | 370/216 |
| 8,203,986 B2* | 6/2012 | Aragon | H04W 52/0232 | 455/574 |
| 8,341,440 B2* | 12/2012 | Diab | G06F 1/266 | 307/29 |
| 8,892,910 B2* | 11/2014 | Shah | H04L 12/40045 | 713/323 |
| 9,100,196 B2* | 8/2015 | Zimmerman | G06F 1/26 | |
| 9,264,240 B2* | 2/2016 | Hiscock | H02J 1/14 | |
| 9,366,082 B2* | 6/2016 | Feldstein | E06B 9/32 | |
| 9,531,551 B2* | 12/2016 | Balasubramanian | H04L 12/10 | |
| 9,712,337 B2* | 7/2017 | Greenwait | G06F 1/3278 | |
| 10,362,035 B1* | 7/2019 | Corbett | H04L 63/102 | |
| 10,620,678 B2* | 4/2020 | Thurmond | H04L 12/10 | |
| 2006/0082222 A1* | 4/2006 | Pincu | G06F 1/3203 | 307/29 |
| 2006/0089230 A1* | 4/2006 | Biederman | G06F 1/266 | 477/34 |
| 2006/0092832 A1* | 5/2006 | Santoso | H04L 45/583 | 370/254 |
| 2006/0092849 A1* | 5/2006 | Santoso | H04L 45/583 | 370/244 |
| 2006/0092853 A1* | 5/2006 | Santoso | H04L 45/583 | 370/254 |
| 2006/0100799 A1* | 5/2006 | Karam | G06F 1/3228 | 702/57 |
| 2006/0273661 A1* | 12/2006 | Toebes | H04L 12/10 | 307/106 |
| 2007/0038769 A1* | 2/2007 | Ryan | H04L 12/10 | 709/230 |
| 2007/0135086 A1* | 6/2007 | Stanford | H04L 12/10 | 370/402 |
| 2007/0136614 A1* | 6/2007 | Heath | H04L 12/10 | 713/300 |
| 2008/0250261 A1* | 10/2008 | Nguyen | G06F 11/30 | 713/340 |
| 2009/0172656 A1* | 7/2009 | Landry | H04L 12/10 | 712/226 |
| 2010/0005320 A1* | 1/2010 | Squillante | H04L 12/10 | 713/300 |
| 2010/0037093 A1* | 2/2010 | Biederman | H04L 12/10 | 714/14 |
| 2010/0153750 A1* | 6/2010 | Shah | H04L 12/10 | 713/300 |
| 2010/0217965 A1* | 8/2010 | Wolff | H04L 12/12 | 713/300 |
| 2010/0299544 A1* | 11/2010 | Hansalia | H04L 12/66 | 713/320 |
| 2011/0107116 A1* | 5/2011 | Diab | H04L 12/10 | 713/300 |
| 2011/0234002 A1* | 9/2011 | Hiscock | H04L 12/10 | 307/32 |
| 2012/0023340 A1* | 1/2012 | Cheung | G06F 1/266 | 370/252 |
| 2012/0166582 A1* | 6/2012 | Binder | G06F 21/78 | 709/217 |
| 2012/0228936 A1* | 9/2012 | Kabbara | G06F 1/3203 | 307/29 |
| 2013/0109371 A1* | 5/2013 | Brogan | G06F 8/60 | 361/679.09 |
| 2013/0201316 A1* | 8/2013 | Binder | G07C 3/02 | 701/2 |
| 2013/0331094 A1* | 12/2013 | Egan | H04W 88/06 | 455/426.1 |
| 2013/0339760 A1* | 12/2013 | Zimmerman | H04L 12/10 | 713/300 |
| 2014/0172133 A1* | 6/2014 | Snyder | H04L 12/12 | 700/90 |
| 2015/0001941 A1* | 1/2015 | Antonio | H02J 9/005 | 307/64 |
| 2015/0006930 A1* | 1/2015 | Antonio | G06F 1/3228 | 713/323 |
| 2015/0127957 A1* | 5/2015 | Sethi | G06F 1/26 | 713/300 |
| 2015/0180276 A1* | 6/2015 | Kanarellis | H04L 12/10 | 307/66 |
| 2015/0244535 A1* | 8/2015 | Chen | H04Q 11/0067 | 713/300 |
| 2015/0323968 A1* | 11/2015 | Chong | H04L 12/10 | 713/300 |
| 2016/0044522 A1* | 2/2016 | Ludlow | H04L 43/0811 | 370/252 |
| 2016/0066360 A1* | 3/2016 | Vinegrad | H04W 4/80 | 455/450 |
| 2016/0154290 A1* | 6/2016 | Brown | G02F 1/153 | 359/275 |
| 2016/0170461 A1* | 6/2016 | Stellick | H04L 12/6418 | 713/310 |
| 2016/0183351 A1* | 6/2016 | Snyder | H05B 47/11 | 315/246 |
| 2016/0219679 A1* | 7/2016 | Snyder | H05B 45/12 |
| 2016/0337137 A1* | 11/2016 | Yseboodt | H04L 12/10 |
| 2017/0010645 A1* | 1/2017 | Jain | G06F 1/266 |
| 2017/0019977 A1* | 1/2017 | Stewart | H05B 47/16 |
| 2017/0126016 A1* | 5/2017 | Andrews | H02J 13/00004 |
| 2017/0195179 A1* | 7/2017 | Chan | H04L 41/0869 |
| 2017/0230074 A1* | 8/2017 | Rose | H04B 1/40 |
| 2017/0310158 A1* | 10/2017 | Kanarellis | H04L 12/10 |
| 2018/0113897 A1* | 4/2018 | Donlan | G06F 16/248 |
| 2018/0219635 A1* | 8/2018 | Sipes, Jr. | G02B 6/4293 |
| 2019/0182056 A1* | 6/2019 | Ramanujam | H04L 12/10 |
| 2019/0212797 A1* | 7/2019 | Karidis | G06F 11/1441 |
| 2019/0229934 A1* | 7/2019 | Zhuang | G06F 1/266 |
| 2019/0323693 A1* | 10/2019 | Bowser | F21V 23/002 |
| 2020/0088832 A1* | 3/2020 | Jarrett | G01S 5/20 |
| 2020/0159307 A1* | 5/2020 | Roy | G06F 1/3209 |
| 2020/0382198 A1* | 12/2020 | Ashrafi | H04B 7/155 |
| 2021/0030479 A1* | 2/2021 | Marti | A61B 34/20 |
| 2021/0091966 A1* | 3/2021 | Roy | H04L 49/15 |
| 2021/0247832 A1* | 8/2021 | Roy | H04L 12/10 |
| 2021/0367642 A1* | 11/2021 | Roy | H04L 41/12 |
| 2022/0014019 A1* | 1/2022 | Wendt | H02J 13/00006 |

FOREIGN PATENT DOCUMENTS

| | | | | |
|---|---|---|---|---|
| CA | 3120654 A1 | * | 5/2020 | G06F 1/266 |
| CN | 1655904 A | * | 8/2005 | B23K 31/006 |
| CN | 111585791 A | * | 8/2020 | |
| DE | 2832156 A | * | 2/1979 | G11B 15/22 |
| EP | 202095 A | * | 11/1986 | C07D 237/20 |
| EP | 1022847 A2 | * | 7/2000 | H03D 3/006 |
| EP | 1146429 A1 | * | 10/2001 | G06F 13/409 |
| EP | 1022847 A3 | * | 1/2002 | H03D 3/006 |
| EP | 1655904 A1 | * | 5/2006 | H04L 45/583 |
| EP | 1677468 A1 | * | 7/2006 | H04L 45/00 |
| EP | 2222018 A1 | * | 8/2010 | H04L 12/10 |
| EP | 2859706 B1 | * | 8/2020 | H04L 69/18 |
| FR | 2859706 A1 | * | 3/2005 | B65D 19/0095 |
| HU | 56554 T | * | 9/1991 | A01N 43/54 |
| JP | 2019177755 A | * | 10/2019 | |
| NL | 9100196 A | * | 8/1991 | G11B 15/22 |
| WO | WO-9002461 A | * | 3/1990 | H04W 84/08 |
| WO | WO-9100196 A | * | 1/1991 | B60P 7/083 |
| WO | WO-9111323 A | * | 8/1991 | B32B 13/14 |
| WO | WO-9212646 A1 | * | 8/1992 | A21B 5/02 |

(56) References Cited

FOREIGN PATENT DOCUMENTS

| WO | WO-03082508 A2 * | 10/2003 | ........... B23K 31/006 |
|---|---|---|---|
| WO | WO-2010114439 A1 * | 10/2010 | ............ G06F 1/325 |
| WO | WO-2012001941 A1 * | 1/2012 | .......... A61K 31/428 |
| WO | WO-2013093047 A1 * | 6/2013 | ............ B01D 11/04 |
| WO | 2017117670 | 7/2017 | |
| WO | 2020102894 | 5/2020 | |
| WO | WO-2020099152 A1 * | 5/2020 | ................ H02J 1/06 |
| WO | WO-2020102894 A1 * | 5/2020 | ............ G06F 1/266 |
| WO | WO-2022198324 A1 * | 9/2022 | ................ H02J 1/00 |

OTHER PUBLICATIONS

GS516TP Gigabit Smart Switches, published in Jun. 2013 by Netgear, 208 pages.
PoE pass through switches, published on Jan. 31, 2019 by Netgear, 3 pages.
Managing Power Distribution via Power over Ethernet (PoE) in Hardwired Networks, accessed on Dec. 4, 2020 by European Editors, 7 pages.
Igor customer presentation in Aug. 2017 on XL Automation Solutions web site, powerpoint presentation, 32 pages.
Impact of 2017 National Electric Code on Power over Ethernet Cabling, published in Nov. 2016, by Panduit Corp., 4 pages.
New National Electrical Code 2017 Requirements Affect POE Wiring, published on Mar. 7, 2017 by Steven deSteuben, 2 pages.
PoE-related amendments proposed to the 2017 NEC, published on Jun. 27, 2017 by Cabling Installation Maintenance, 4 pages.
Power Over Ethernet Lighting—Evolution or Revolution?, published in Nov. 2015 by UL 9 pages.
Office Action issued by the USPTO dated Feb. 4, 2021 in connection with U.S. Appl. No. 16/688,563, 20 pages.

* cited by examiner

INTERMEDIARY DEVICE FOR DAISY CHAIN AND TREE CONFIGURATION IN HYBRID DATA/POWER CONNECTION

CROSS-REFERENCE TO RELATED APPLICATIONS

The present application is related to U.S. Provisional Patent Application Ser. No. 62/904,852, filed on Sep. 24, 2019, and to U.S. Provisional Patent Application Ser. No. 63/027,195, filed on May 19, 2020, the contents of both referenced applications are hereby incorporated herein by reference.

TECHNICAL FIELD

The present disclosure relates generally to power distribution over data connections and, in particular embodiments, to configuring an intermediary device for use among a plurality of similarly-configured intermediary devices.

BACKGROUND

Technologies exist that allow for supplying power over a medium that is also used for transmitting data. For example, the medium may be a cable. An example of this technology is known as Power over Ethernet (PoE). In PoE, power is supplied over an Ethernet cable along with data. In general, a PoE connection may be considered an example of a hybrid data/power connection.

Such hybrid data/power connections are generally used between a source of data/power and a device that is configured to receive the data, receive the power or receive both the data and the power. In one particular example, a PoE system typically includes power sourcing equipment (PSE), a powered device (PD) and an Ethernet cable. The PSE supplies the Ethernet cable with the power. The PD is configured to receive the power supplied over the Ethernet cable. The PD is then able to operate using the received power.

Examples of PSEs include network switches and modems. Examples of PDs include edge devices such as Internet Protocol (IP) cameras and voice over internet protocol (VoIP) telephones. Using PoE, these edge devices are able to operate on the basis of electrical power received over the Ethernet cable, without the need for an auxiliary power supply.

SUMMARY

Aspects of the present application relate to interposing a plurality of intermediary devices in a hybrid data/power connection between a power source and a powered device. In one aspect, the intermediary devices may be connected in series. Such connecting may be referred to as "daisy chaining." Each intermediary device may be configured to consume, for its own use, power that is supplied over the hybrid data/power connection and to deliver remaining power over the hybrid data/power connection to another device.

According to an aspect of the present disclosure, there is provided a An intermediary device (ID) configured to be connected between power sourcing equipment (PSE) and a powered device (PD), the ID comprising a power tap device. The power tap device includes an upstream port adapted to interface with an upstream device over a first connection, the first connection configured to carry data and input electrical power, the upstream direction defined as toward the PSE, a downstream port adapted to interface with a downstream device over a second connection, the second connection configured to carry data and output electrical power, the downstream direction defined as toward the PD, a dedicated device output port to interface with a dependent device over a third connection, the third connection configured to carry data and electrical power and a switching processor configured to control a flow of electrical power from the upstream port to the downstream port and the dedicated device output port.

According to another aspect of the present disclosure, there is provided, at a power sourcing equipment (PSE) for a network, a method for distributing power among a plurality of devices. The method includes receiving a request message in a first extension packet, the request message having contents that include a request for a specific amount of power and an indication of a topology for the network, determining, using the contents of the message, a distribution plan for distributing available power throughout the network and transmitting an instruction message in a second extension packet, the instruction message implementing the distribution plan.

According to another aspect of the present disclosure, there is provided an intermediary device (ID) configured to be connected between power sourcing equipment (PSE) and a powered device (PD). The ID includes a power tap device including an upstream port adapted to interface with an upstream device over a first connection, the first connection configured to carry data and input electrical power, the upstream direction defined as toward the PSE, a downstream port adapted to interface with a downstream device over a second connection, the second connection configured to carry data and output electrical power, the downstream direction defined as toward the PD, a dedicated input port to interface with a power supply over a third connection, the third connection configured to carry electrical power and a switching processor configured to control a flow of electrical power from the upstream port and the dedicated input port to the downstream port.

According to another aspect of the present disclosure, there is provided an intermediary device (ID) configured to be connected between power sourcing equipment (PSE) and a powered device (PD). The ID includes an upstream port adapted to interface with an upstream device over a first connection in an upstream direction, the first connection configured to carry data and input electrical power, the upstream direction defined as toward the PSE, a downstream port adapted to interface with a downstream device over a second connection in a downstream direction, the second connection configured to carry data and output electrical power, the downstream direction defined as toward the PD, an output port to interface with a dependent device over a third connection, the third connection configured to carry data and electrical power and a switching processor. The switching processor is configured to control, according to a power distribution topology, a flow of electrical power from the upstream port to the downstream port and the device output port and control, according to a data distribution topology, a flow of data between the upstream port and the downstream port and between the upstream port and the output port.

According to another aspect of the present disclosure, there is provided an intermediary device (ID) configured to be connected between power sourcing equipment (PSE) and a powered device (PD). The ID includes a battery and a power tap device. The power tap device includes an upstream port adapted to interface with an upstream device over a first connection, the first connection configured to carry data and input electrical power, the upstream direction defined as toward the PSE, a downstream port adapted to interface with a downstream device over a second connection, the second connection configured to carry data and output electrical power, the downstream direction defined as toward the PD, a dedicated device output port to interface with a dependent device over a third connection, the third connection configured to carry data and electrical power, a battery port adapted to interface with the over a fourth connection, the fourth connection configured to carry electrical power and a switching processor. The a switching processor is configured to control a flow of electrical power from the upstream port to the downstream port and the dedicated device output port, determine a nominal total power request based on a dependent device power request and a downstream device power request, transmit upstream a request message, the request message specifying an actual total power request, wherein the actual total power request exceeds the nominal total power request and, in operation, direct received power in excess of power allocated to the dedicated device output port and the downstream output port to the battery port.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

It may be shown that the PoE standards have evolved to allow ever-increasing quantities of power to be transmitted over an Ethernet cable. It may be also shown that the so-called "power budgets" that are enabled by these ever-increasing quantities of power will soon be able to accommodate the power needs of a plurality of devices.

In an aspect of the present application, an intermediary device (ID) may be configured for being interposed between a PSE and a PD. In a more complex aspect of the present application, a plurality of IDs may be configured for being inserted between a PSE and a PD in a so-called "daisy chain" configuration.

Figure 1:
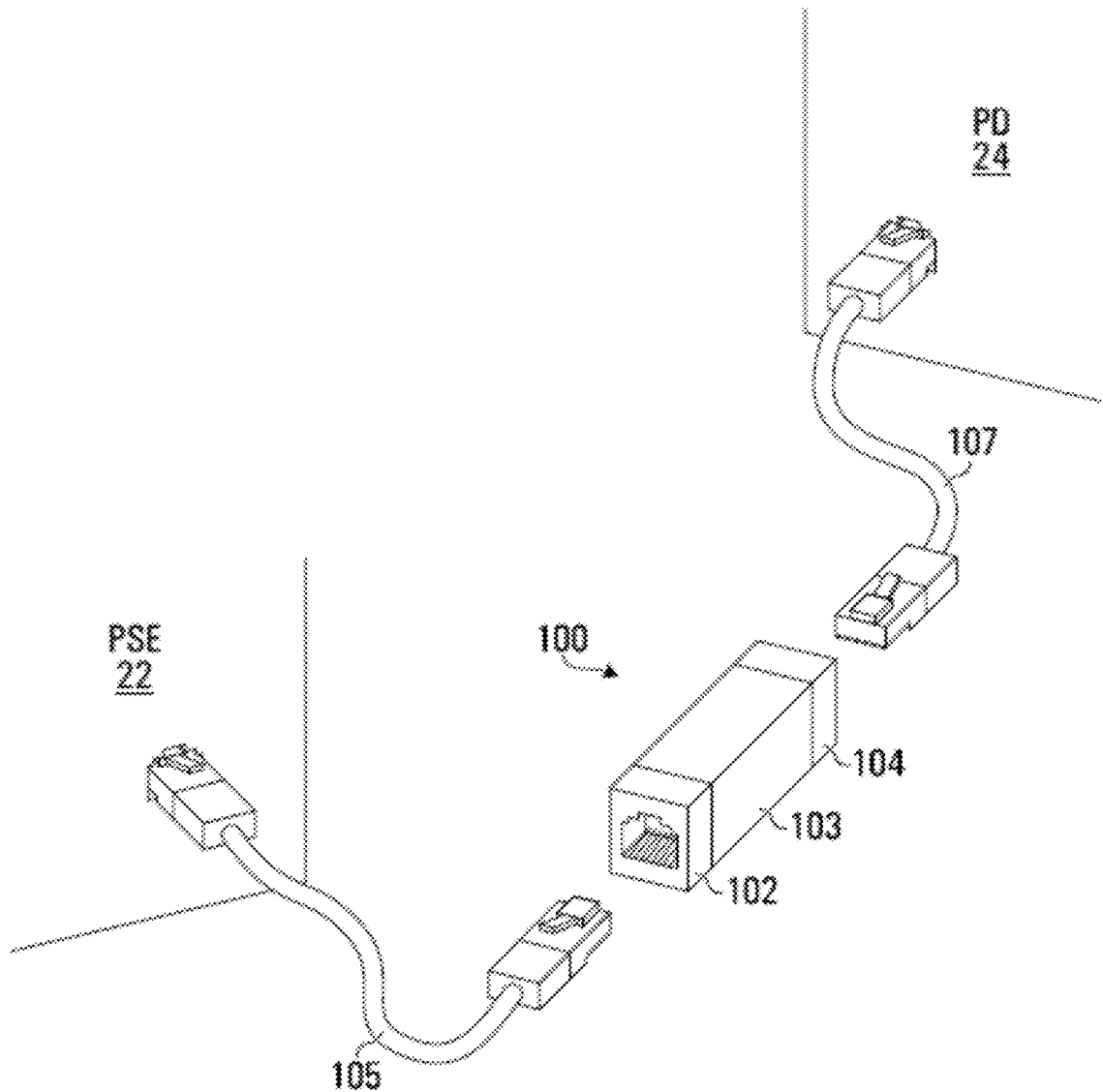
FIG. 1 illustrates an intermediate device (ID) in use in accordance with aspects of the present application.

FIG. 1 illustrates an ID 100 as including an upstream port 102, a downstream port 104 and a housing 103, in which internal circuitry (not shown) for the ID 100 may be contained. The internal circuitry may be responsible for some built-in functionality for the ID 100.

In operation, the intermediary device 100 is inserted between power sourcing equipment (PSE) 22 and a powered device (PD) 24. Although the term "PSE" is often used in the context of a Power over Ethernet (PoE) standard, the term "PSE" as used herein is not limited to PoE. Instead, PSE may denote any device that supplies or injects power over a data connection. Similarly, although the term "PD" is also often used in the context of a PoE standard, the term "PD" as used herein is not limited to PoE. Instead, the term PD may be used to refer to a device that operates using the power supplied by a PSE over a data connection. Also, even though the term PD is used, the PD 24 may not always be powered, e.g., when the PD 24 is connected to the ID 100 but no power is yet supplied from the ID 100 to the PD 24.

The ID 100 may be inserted into the connection between the PSE 22 and the PD 24 by plugging one end of an upstream data connection cable 105 into the PSE 22 and the other end of the upstream data connection cable 105 into the upstream port 102. Similarly, one end of a downstream data connection cable 107 may be plugged into the PD 24 and the other end of the downstream data connection cable 107 may be plugged into the downstream port 104.

The ID 100 may consume, for the built-in functionality, some of the power supplied over the hybrid data/power connection represented by the upstream data connection cable 105 and deliver remaining power to the PD 24. A technical challenge exists for the ID 100 in that the PD 24 may or may not be configured to use the maximum amount of power that the PSE 22 is configured to supply. Specifically, there may not necessarily be enough power supplied by the PSE 22 for use by the PD 24 and for use for the built-in functionality of the ID 100. Typically, the power over a hybrid data/power connection is designed to be delivered point-to-point, i.e., by design, the PD 24 connects to the PSE 22 and acts as the power load. This design stands in contrast to a situation wherein the PD 24 together with the ID 100 appear as the power load on the PSE 22.

The ID 100 may act to determine whether there is enough power for the built-in functionality of the ID 100 to operate. Possibly, the ID 100 may act to take specific actions in those cases wherein there does not appear to be enough power for the built-in functionality of the ID 100. Possible actions may include: ceasing to supply power to the PD 24; switching the built-in functionality of the ID 100 to a lower power mode; or monitoring the instantaneous power consumed by the PD 24 to determine whether the PD 24, in operation, tends to consume less power than the amount of power that the PD 24 has negotiated. The ID 100 may act to switch itself off and passthrough all power to the PD 24.

It should be clear that the terms "upstream" and "downstream," with respect to the ports in this context, pertain to an expected direction of power supply and have no bearing on directionality of data flow. In certain instances, one or both of the upstream data connection cable 105 and the downstream data connection cable 107 may be integrated with the ID 100. For example, if the ID 100 is intended to be installed near the PD 24, the physical connectivity of the downstream port 104 may be absent, with the data connection cable of a particular (e.g., short) length projecting directly from the housing 103 of the intermediary device 100. Insofar as there is, within the ID 100, a connection to provide data connectivity and power over the upstream data connection cable 105, the downstream port 104 may still be present within the intermediary device 100, if not physically manipulatable from the outside.

Note that, in FIG. 1, the upstream data connection cable 105 and the downstream data connection cable 107 are illustrated as being Ethernet cables. This is because most of the embodiments below are explained in relation to a PoE standard. It should be clear that PoE is only an example. The ID 100 may operate in any application in which power is supplied over a data connection. As one example, the ID 100 may be placed between a PSE and a PD operating according to the Power over Data Lines (PoDL) standard.

Most of the embodiments below are explained in relation to a PoE standard. A PoE standard may be any one of the different versions of PoE currently existing or in future use, e.g., 802.3at Type 1, 802.3at Type 2, 802.3bt Type 3, 802.3bt Type 4, etc.

Figure 2:
FIG. 2 illustrates a plurality of simple IDs configured in a daisy chain in accordance with aspects of the present application.

FIG. 2 illustrates a plurality of simple IDs including a first simple ID 200A, a second simple ID 200B and a third simple ID 200C (collectively or individually 200) configured in a daisy chain, that is, a logical straight line. In the configuration illustrated in FIG. 2, the input of the first simple ID 200A is connected to the output of the PSE 22, the input of the second simple ID 200B is connected to the output of the first simple ID 200A the input of the third simple ID 200C is connected to the output of the second simple ID 200B and the output of the third simple ID 200C is connected to the PD 24. The built-in functionality of the simple IDs 200 may, for example, relate to providing light. That is, the daisy chain of simple IDs 200 of FIG. 2 may operate as a string of lights. The designation "simple" that has been given to the IDs 200 in FIG. 2 is given in relation to capabilities of software or firmware executed by a processor (not shown) of the simple IDs 200.

A close examination of the manner in which the configuration of the simple IDs in FIG. 2 reacts to power initially provided by the PSE 22 reveals a power-up sequence that may be termed a "cascading" or "recursive" power-up sequence. In such a power-up sequence, the simple IDs 200 power up one at a time, starting from the first simple ID 200A. The first simple ID 200A performs steps that include a power-up step, a power negotiation step and then a step wherein the first simple ID 200A opens a downstream connection to provide power to the second simple ID 200B. The second simple ID 200B, in turn, carries out the same steps. The third simple ID 200C, in turn, carries out the same steps.

In overview, aspects of the present application relate to adding some complexity to the configuration of each ID to improve the overall system. This complexity may be in the form of additional capabilities in the hardware of the IDs and/or additional capabilities in the software/firmware of the IDs, thereby leading to additional capabilities in the manner in which the IDs communicate with the PSE 22 and each other. Through these additional capabilities, the overall system may be shown to be improved in such areas as efficiency of power utilization, flexibility of configuration, ease of diagnosis, etc.

Figure 3:
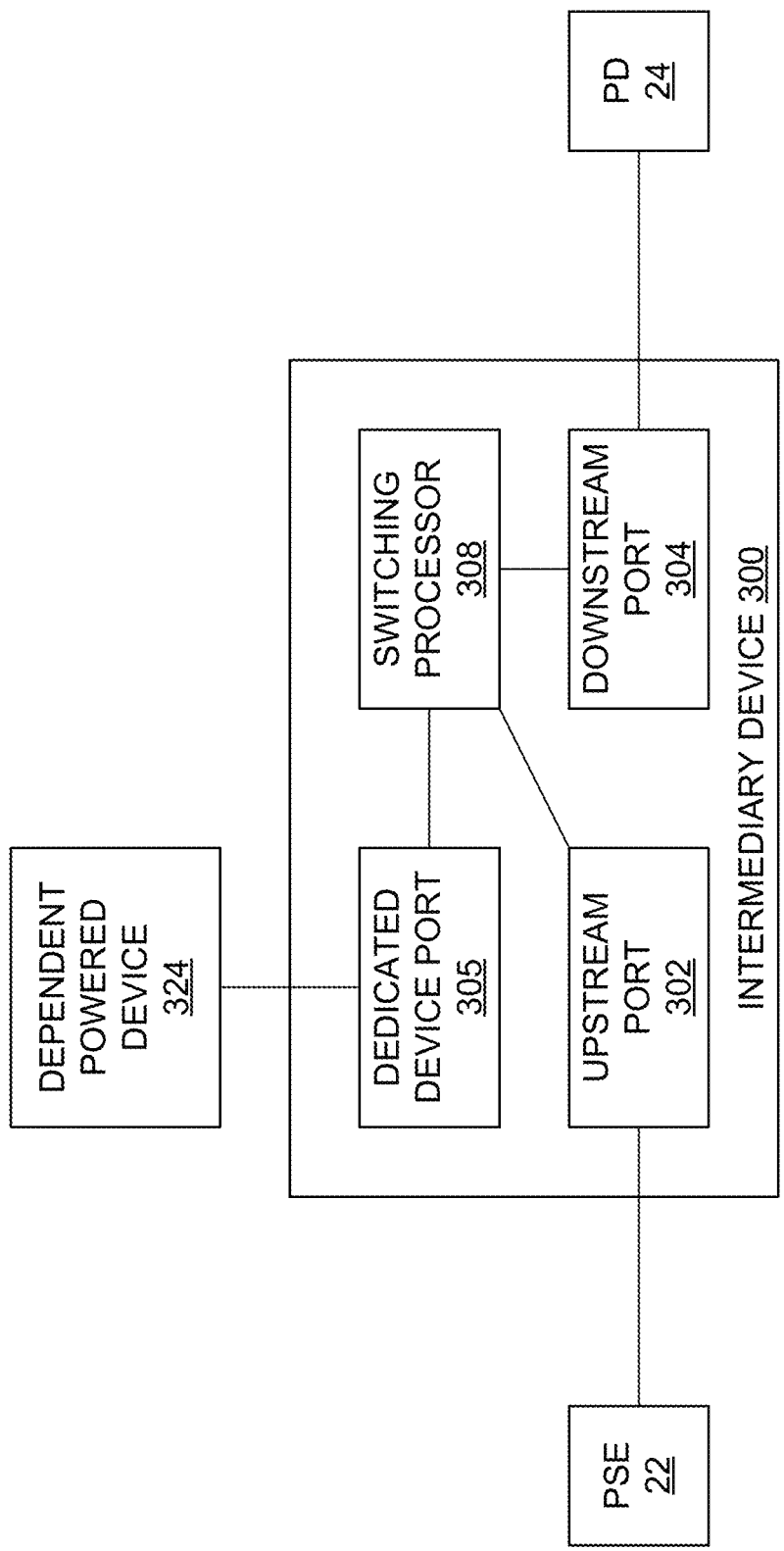
FIG. 3 illustrates two main components of an example complex ID, including a power tapping device component and a dependent powered device component in accordance with aspects of the present application.

FIG. 3 illustrates components of an example complex ID 300. The example complex ID 300 of FIG. 3 may be considered to be a power tapping (PT) device that services a "dependent" or "dedicated" powered device 324 component. In common with the ID 100 of FIG. 1, which has the upstream port 102 and the downstream port 104, the example complex ID 300 of FIG. 3 includes an upstream port 302 and a downstream port 304. The example complex ID 300 of FIG. 3 also includes a dedicated device port 305 and a switching processor 308 connected to the upstream port 302, the downstream port 304 and the dedicated device port 305.

Notably, FIGS. 2 and 3 schematically illustrate a single connection between devices. It will be understood by the person of ordinary skill in the art that the single connection often carries both power and data. In FIG. 3, for example, data comes into the complex ID 300 in the form of Ethernet packets in an IP network. In a regular PoE implementation, RJ45 magnetics act to decouple data lines from power lines. The RJ45 magnetics route the data lines towards an Ethernet port (a so-called "PHY"), which is a physical layer electronic circuit. The RJ45 magnetics route the power lines towards power circuitry. In the case of the complex ID 300 in the middle of an Ethernet link, the data coming into the complex ID 300 can be destined either to the complex ID 300 or to the external PD 24 connected to the complex ID 300. Bridging data and power through an intermediate device is explored more thoroughly in U.S. patent application Ser. No. 16/688,563, filed Nov. 19, 2019, which is hereby incorporated herein by reference.

In operation, the complex ID 300 manages receipt of a hybrid data/power connection and, rather than having built-in functionality, the dedicated device port 305 allows for a hybrid data/power cable to be plugged in so that a connection may be established between the complex ID 300 and the dependent powered device 324.

Accordingly, if there is a goal to replicate the daisy chain of FIG. 2, the series connection of IDs 200 with built-in light functionality may be replaced by a series connection of devices configured like the complex ID 300 of FIG. 3 with any known PoE-powered light as the dependent powered device 324.

The complex ID 300 is illustrated as a three-port device. The complex ID 300 is illustrated with the upstream port 302 for connecting to the PSE 22 and two downstream ports, the downstream port 304 for connecting to the PD 24 and the dedicated device port 305 for connecting to the dependent powered device 324.

The downstream port 304 and the dedicated device port 305 may be equal, or one of the ports, e.g., the dedicated device port 305 for the dependent powered device 324, may be considered as being designated for optionally providing power to an "added" device and the other port, e.g., the downstream port 304, may be considered as being designated for nominally providing power to an "original" device, i.e., the PD 24. In other scenarios, a network device that would typically be a PD itself, may be provisioned with power tapping ability and a downstream port to allow the addition of a downstream device if there is enough power budget for such an addition.

For the complex ID 300 to successfully appear, to the PSE 22, to be a powered device like the PD 24, the complex ID 300 communicates, on the physical layer, with the PSE 22 to negotiate a quantity of electrical power in a manner consistent with the manner in which the PD 24 would normally communicate, on the physical layer, with the PSE 22 to negotiate a quantity of electrical power. Infrastructure included in an intermediate device to facilitate such negotiation is explored more thoroughly in U.S. patent application Ser. No. 16/688,563, filed Nov. 19, 2019, reference hereinbefore. In a broad case, the complex ID 300 serves as a PoE power router/bifurcator and power negotiations for the PD 24 are replicated for the dependent powered device 324.

Notably, physical layer negotiations cannot generally be revisited once a power grant has been established. The Link Layer Discovery Protocol (LLDP) is a layer-2 Ethernet protocol for managing devices. The LLDP generally allows an exchange of information between a PSE and a PD. This information is formatted in Type-length-value (TLV) format. PoE standards define TLV structures used by PSEs and PDs to signal and negotiate available power. In aspects of the present application, the exchange leads to the complex ID 300 changing a negotiated quantity of electrical power requested from the PSE 22. The complex ID 300 may, for example, employ known TLVs called power-via-MDI TLVs, where the acronym MDI stands for Media Dependent Interface. Alternatively, the complex ID 300 may, as standards develop and change, employ any other/future TLVs reserved for PoE purposes. Unfortunately, when the complex ID 300 commences physical layer negotiations with the PSE 22, the complex ID 300 does not have a priori information regarding whether the LLDP is available at the PSE 22. One strategy to deal with the lack of a priori information involves the complex ID 300 negotiating maximum power from the PSE 22 during the physical layer negotiations. This is before even negotiating with the dependent powered device 324 and the PD 24. At a later point in time, it is expected that the switching processor 308 will communicate with the dependent powered device 324 and, thereby, determine how much electrical power the dependent powered device 324 requests. Additionally, it is expected that the switching processor 308 will communicate with the PD 24 and, thereby, determine how much electrical power the PD 24 requests.

The switching processor 308 may, thereby, determine a total of three electrical power quantities: the electrical power requested by the PD 24; the electrical power requested by the dependent powered device 324; and the electrical power for routine operation of the complex ID 300. Cases are contemplated wherein there are constraints limiting or defining the power that the complex ID 300 provides to the PD 24 (or to the dependent powered device 324). For one example, the dependent powered device 324 or the PD 24 may be integrated with the complex ID 300 and have a known power requirement. For another example, the complex ID 300 may be configured to accept only a known device (with known power requirements) as the PD 24 or as the dependent powered device 324. For a still further example, the complex ID 300 may be configured to provide a fixed power, such that the electrical power for the PD 24 and/or the dependent powered device 324 may be already known and thereby eliminating a specific step of determining a total power to be requested.

The switching processor 308 may determine that LLDP messaging is understood at the PSE 22 and the switching processor 308 may determine that the total of the three electrical power quantities is less than the maximum power initially negotiated from the PSE 22. In such a case, the switching processor 308 may employ the LLDP to renegotiate with the PSE 22 to reduce the requested amount of electrical power. That is, the complex ID 300 may, initially and using the physical layer, request maximum available power and, subsequently and using the LLDP, fine tune the requested power to more closely match the quantity of power that allows for operation of the switching processor 308 while satisfying power requests received at the dedicated device output port 305 and the downstream output port 304. Indeed, rather than requesting a maximum power and renegotiating with the PSE 22 to reduce the requested amount of electrical power, the complex ID 300 may request a first (non-maximum) amount of power, which is sufficient power to operate to negotiate with dependent (downstream) devices. Then, if the amount of power requested by downstream devices exceeds the amount of power granted, the complex ID 300 may use the LLDP to renegotiate with the PSE 22 to increase the requested amount of electrical power to, thereby, fine tune the requested power to more closely match the quantity of power.

The dedicated device port 305 may be considered to differentiate the complex ID 300 (IDs of a first type) from the simple IDs 200 (IDs of a second type) of FIG. 2. The components (not shown) of the simple IDs 200 may include an upstream port, a downstream port and a switching processor. The simple IDs 200 may include a dependent powered device connected directly to the switching processor, rather than being connected to the switching processor via a dedicated device port, as illustrated for the complex ID 300 in FIG. 3. Accordingly, the complex ID 300 may be considered to be a three-port device, while the simple ID 200 may be considered to be a two-port device.

Figure 4:
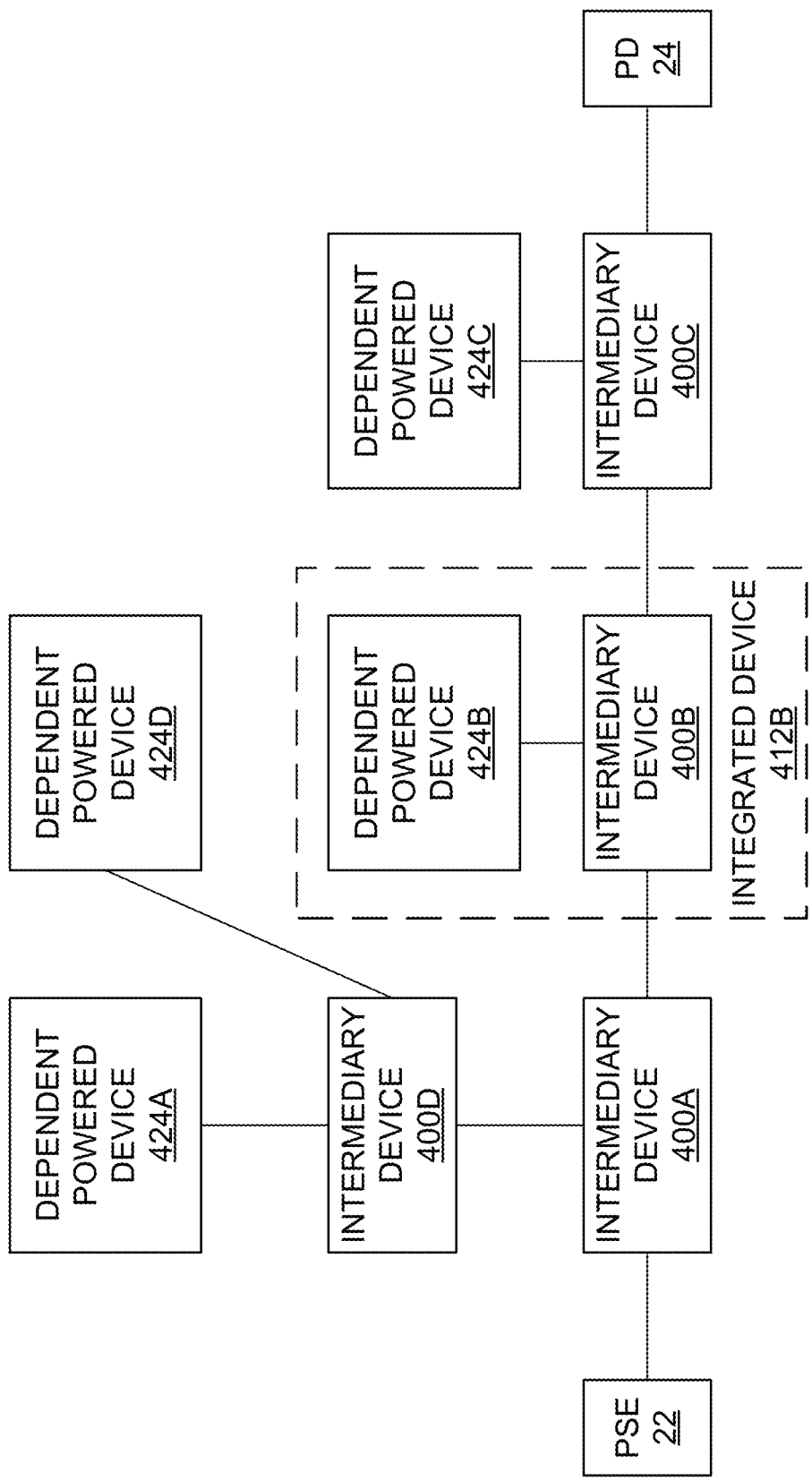
FIG. 4 illustrates a plurality of complex IDs configured in a daisy chain with a further complex ID interposing a first power tap device and a first dependent powered device in accordance with aspects of the present application.

The distinction between the complex ID 300 and the dependent powered device 324 allows for topologies that are distinct from the topology illustrated in FIG. 2. One example such topology is illustrated in FIG. 4. In a manner similar to the example presented in FIG. 2, FIG. 4 illustrates a plurality of IDs including a first complex ID 400A, a second complex ID 400B and a third complex ID 400C (collectively or individually 400) configured in a daisy chain, that is, a logical straight line. In the configuration illustrated in FIG. 4, the input of the first complex ID 400A is connected to the output of the PSE 22, the input of the second complex ID 400B is connected to the output of the first complex ID 400A the input of the third complex ID 400C is connected to the output of the second complex ID 400B and the output of the third complex ID 400C is connected to the PD 24.

In a manner similar to the example presented in FIG. 3, the first complex ID 400A of FIG. 4 is illustrated as associated with a first dependent powered device 424A. Furthermore, the second complex ID 400B of FIG. 4 is illustrated as associated with a second dependent powered device 424B. Moreover, the third complex ID 400C of FIG. 4 is illustrated as associated with a third dependent powered device 424C. Notably, a fourth complex ID 400D interposes the first complex ID 400A and the first dependent powered device 424A. The fourth complex ID 400 is illustrated as associated with a fourth dependent powered device 424D. It should be clear that a plurality of further intermediary devices may be connected in in the manners illustrated in FIG. 4 to, thereby, create an entire tree network with multiple branches. Recent updates to various PoE standards allow for delivery of increasing amounts of power (51 W, 71 W and more). Accordingly, a large number of downstream devices may be able to be supported by the power delivered at the upstream port 302.

Notably, according to some aspects of the present application, a dependent device may be integrated with an ID, in which case the connection between the dependent device and the ID is internal to the integrated device. An example is illustrated in FIG. 4 as an integrated device 412B, which includes the second complex ID 400B and the dependent powered device 424B.

In the context of the daisy chain of simple IDs 200 in FIG. 2, a cascading power-up sequence was discussed. Without regard to whether a plurality of IDs are arranged in a branched (tree) network or in a linear (daisy chain) network, an efficient power-up sequence is desirable.

Notably, power requests are assessed completely by the PSE 22 before access to power is actually granted by the PSE 22. When power is granted by the PSE 22, there may be conditions associated with the grant. Furthermore, for a particular ID, the PSE 22 may grant all the requested power, none of the requested power or some of the requested power. In the case wherein a power-up sequence is used that is modelled on the cascading power-up sequence, it may be shown that power will be granted to IDs downstream from the PSE 22 until a given switching processor requests more electrical power than remains available in a power grant negotiated by an ID that is connected directly to the PSE 22. Responsive to the given switching processor requesting more electrical power than remains available, a given ID that includes a given power tap device that includes the given switching processor will be denied the request for power. Responsive to being denied power, the given switching processor may shut down the given ID. Notably, there is a possibility that, beyond the given ID, further downstream, there exists one (or many) IDs that require far less power and, accordingly, which could be powered by less electrical power than remains available.

Consider, in the example of FIG. 4, that the PSE 22 has a power budget of 25 W. The first complex ID 400A may have a requirement of 15 W and the second complex ID 400B may have a requirement of 15 W. The third complex ID 400C and the PD 24 may each have a requirement of 3 W. The first complex ID 400A may negotiate the full 25 W from the PSE 22. The second complex ID 400B may then attempt to negotiate 15 W from the first complex ID 400A. In recognition of only 10 W remaining in the granted power budget, the first complex ID 400A may deny the second complex ID 400B the requested power. It can be shown that the third complex ID 400C and the PD 24 could be powered if there were a way to deny power the second complex ID 400B yet still arrange that the second complex ID 400B could pass power downstream to the third complex ID 400C and to the PD 24.

Consider, also, that the combination of the first complex ID 400A and the first dependent powered device 424A may only have a requirement for 3 W. That is, the addition of the fourth complex ID 400D, in a branch extending from the first complex ID 400A, is responsible for the power requirement of the first complex ID 400A to jump from 3 W to 15 W. Accordingly, the addition of the fourth complex ID 400D is responsible for the denial of power to the second complex ID 400B and, consequently, the denial of power to the third complex ID 400C.

It may be that it is desirable to assign the fourth complex ID 400D a lower priority than the other complex IDs 400. It may be that it is desirable to assign the PD 24 a higher priority than all of the complex IDs 400. Unfortunately, it can be shown that a network of known intermediary devices fails to allow for deviation from a default prioritization scheme wherein certain devices are prioritized over other devices.

For one example prioritization scheme, it may be desirable to prioritize devices to power-on in a certain order.

For another example prioritization scheme, it may be desirable to only power-on certain ones of the dependent powered devices.

Consider a daisy chain of hallway lights. Responsive to a temporary dip in available power, it may be desirable to configure the daisy chain such that, initially, every second light may be denied power. Responsive to the dip in available power deepening, every third light may be denied power. Responsive to the dip in available power further deepening, every fourth light may be denied power and so on.

A cascading power-up sequence for known IDs may be considered to have a corresponding cascading power-down sequence wherein, for the hallway light example, lights will go out from furthest-to-closest, thereby leaving a growing dark area in the end of the hallway. In contrast, as available power fades for the daisy chain of hallway lights configured as envisioned in the foregoing, the result is an ever dimming light throughout the length of the hallway.

Assuming that there are an arbitrary number of known IDs in a network with a given topology, information is not available regarding which known IDs have been granted power, which known IDs have not been granted power, the circumstances under which the known IDs have or have not been granted power, where failure points lie and the layout of the given topology.

Aspects of the present application relate to extending the known PoE standard and the LLDP to allow for inter-device communication. At the moment, the LLDP only allows for communication between one PD and one PSE. That is, LLDP fails to take into account the possibility of there being devices between the PSE and the PD. Aspects of the present application relate to adding communication messages to the LLDP to allow for receipt of information about power requirements and topology and transmission of instructions. Note that link-layer LLDP signals are considered in the following example. Physical layer (e.g., resistor-based) protocols are evolving and new protocols may be developed on all layers in the future. Accordingly, it should be clear that various paradigms discussed in the present application may be implemented in different layers.

Notably, command and control of power routing may use the (higher level) data network, in spite of the fact that the power and data are routed independently of one another. For example, signaling standards may be expanded to include the extension packet at a higher Open Systems Interconnection (OSI) layer. Consider that a network entity (the PSE 22 or a specific ID) may be provided with an ability to address simple IDs 200 or complex IDs 300 over an Internet Protocol (IP) connection to read the state of each ID or give the IDs instructions.

The switching processor 308 may be controlled by logic that is received and transmitted over the data network, thereby forming a sort of "bridge" between the data network and the power network. Power is still routed independently of data, but information and commands about the power usage and routing are communicated over the higher layer (e.g., IP) data network. Likewise, the switching processor 308 may be configured to report over the data network. The switching processor 308 may provide information about its own power requirement, as well as, optionally, what the switching processor 308 has discovered about other connected devices and their respective power requirements, to another device on the network. The other device may be the PSE 22, if the PSE 22 is configured to act as a router. Alternatively, the other device may be a server.

In one implementation, devices only act to communicate with their immediate upstream neighbor device or to upstream and downstream neighbor devices. In the network illustrated in FIG. 4, nearly every complex ID 400 (a node in the network) has an upstream side (a connection to a parent node) and a downstream side (a connection to a child node). If every complex ID 400 communicates information about itself upstream, then this information can be propagated to every parent node and every node may receive information about every child node right up to the root of the tree, the PSE 22. In one example implementation, an extension packet is generated and transmitted by each complex ID 400 when declaring its power requirements. The extension packet may relate to an extension to an LLDP message according to an extended LLDP protocol. Alternatively, the extension packet may relate to an expansion of power signaling to a higher layer.

In one example, the existing Power via MDI TLV or Power via MDI Measurements TLVs provided in the PoE standard may be extended to provide inter-device communication to, for example, communicate to one another information about neighboring devices to which they are connected.

In another example, such power signaling may be provided using custom TLVs. In order to create a custom TLV, the LLDP Ethernet frame structure may be used, with the TLV type set to 127 (Custom TLVs). One particular example of implementation involves use of an Organizationally Unique Identifier (OUI, 24-bits) in the custom TLV. For example, a custom OUI may be used to identify the custom TLV as originating at an ID that other IDs can recognize. Furthermore a sub-type specific to the OUI may allow the originating ID to identify itself as an intermediary device and also indicate that the custom TLV specifically pertains to power routing or a to particular type of power network, such as mesh-PoE power network. The rest of the custom TLV may incorporate an "organizationally defined information string." Here, an agreed-upon pattern may be used to define the power information. The reader will appreciate that this agreed-upon pattern can be provided in any form desired. For example, a first byte may be reserved to represent a specific identifier for the ID sending the custom TLV. Another byte may be reserved to represent status information, e.g., representative of whether the ID powered on in a full power mode, powered on in a reduced power mode (e.g., a low-power mode), etc. Another byte may indicate how many branches are connected to the ID, e.g., a number of downstream branches. For example, a value of 1 may mean that the node splits into a branch and a value of 0 could mean that the device does not split into any branches, etc. Yet another byte may indicate how many devices are next to, or downstream from the ID in a daisy-chain. For example, a value of 12 may mean that 12 devices are connected downstream from the ID in the daisy chain. Finally, additional bytes, e.g., three bytes, may be reserved to share the amount of power requested/used in each branch. For example, the first byte has a value of 123, thereby indicating that branch A is using 12.3 W in total, the second byte has a value of 14, thereby indicating that only 1.4 W is requested/used in total on branch B, and the third byte has a value of 2, thereby indicating that the ID is only requesting/using 0.2 W for itself). This provides a conduit for representing data described further hereinafter ("I(1 W), A(5 W), B(I(1 W),A(2 W),B(5 W))" in logical format.

Higher level (network layer, transport layer, right up to application layer) signaling may also be used, e.g., in addition to physical layer protocols and link layer protocols, to negotiate power and establish power routing instructions, information, priorities and topology. For example, complex IDs may run application layer programming that manages or monitors power routing, which generate and transmit, as well as receive and interpret, application layer messages, which are shared over the data network with other IDs or compatible devices. Such messages may include topology information, including information about the number of branches, power requirements, etc., pertaining to themselves and connected devices, as well as available information about the network devices requiring such power in order to declare or establish power priorities, power-routing topology and the like.

In one example, an existing network topology protocol is adapted to this end, for example, the Spanning Tree Protocol (STP) or the Rapid Spanning Tree Protocol (RSTP) (IEEE 802.1w). In such a case, the existing standards may be modified to represent power routing, rather than data routing capabilities and may furthermore be modified not to break cycles, e.g., by not rejecting links classified as backups. An example of such a (latter) modification which may be adapted to this purpose is suggested in Son, Myunghee & Kim, Byung-Chul & LEE, Jaeyong. (2006). Topology Discovery in Large Ethernet Mesh Networks. IEICE Transactions on Communications. E89B. 10.1093/ietcom/e89-b.1.66. Preferably, the tapping devices, whether implemented as simple IDs 200 of FIG. 2 or implemented as the complex IDs 400 of FIG. 4, have an "internal only" power mode in which they begin operation. In this mode, only their internal power is used, they do not power other devices. The tapping devices may be configured to negotiate whatever power they need to run themselves with the idea that they will adjust later for the power needs of their dependents. Note, however, that, in the initial physical layer portion of the negotiations, the tapping devices may be configured to request maximum power available because, if device that is upstream of the tapping device is a physicallayer-only (i.e., no LLDP) device, the tapping device will be unable to request more power later. It follows that, if the tapping device succeeds in communicating with the upstream device using the LLDP, the tapping device can immediately use LLDP signaling reduce the quantity of power requested. Once all tapping devices have received their internal power and booted up, each tapping device can negotiate with their downstream devices need and determine their own total power request. This information is then passed upstream using the extension packets. This example may appear somewhat similar to the cascading power-up sequence. In contrast with the cascading power-up sequence, according to this example, no actual power is distributed. Instead, only information is propagated, where the information indicates power requests for individual IDs. It should be clear that, in some aspects of operation of a network of complex IDs and simple IDs, the simplicity of a cascading power-up sequence is configurable and desirable, especially for the simplicity of such a power-up sequence.

Each complex ID, once it has determined a total downstream power request, may add, to the total, its own internal power request to form a revised total. The complex ID may then communicate the revised total upstream, where the next complex ID may do the same. If the complex ID has multiple ports, the complex ID will have multiple power demands to add to their own power demands, one power demand for each port, and the complex ID may store a power request associated with each port. This way, if the complex ID determines that the granted power is insufficient for meeting the demands of all ports, then the switching processor 308 can select which port or ports to which to grant power based on various selection criteria. An example selection criterion may relate to which port has requested less than the available power. Another example selection criterion may be based on a priority basis, e.g., one port may be a "dedicated" port or a "top priority" port. Consider an example scenario wherein the complex ID has been granted 15 W and a first port demands 20 W and a second port demands 10 W. In such a scenario, it is straightforward for the switching processor 308 to grant the request of the second port and deny the request of the first port. The switching processor 308 may, upon deciding the manner in which granted power is to be distributed, transmit a message to the PSE 22 to indicate the manner in which the switching processor 308 has deviated from instructions received from the PSE 22.

In this example, the PSE 22 only receives information regarding a total power request. Responsively, the PSE 22 provides the power that is available to be provided by the PSE 22. In one embodiment, the PSE 22 may be blind to the number of devices and the manner in which the requested power would be distributed. Once the power is granted to the first tapping device downstream of the PSE 22, power granting propagates downward until all tapping devices are powered or until power runs out, with certain downstream tapping devices left without receiving a grant of requested power. In this example, the selection of tapping devices to leave dark is carried out on a port level and, as such, entire branches may be left without receiving a grant of requested power. That is, there is no provision to have a node pass power through while not employing any of the power. Notably, in a tapping device with two output ports and in a situation where the available power is insufficient to grant power requests from both the downstream port 304 and the dedicated device output port 305, the switching processor 308 may select one port among the downstream port 304 and the dedicated device output port 305 to which to provide requested power.

According to aspects of the present application, when a tapping device sends an extension packet upstream, the extension packet includes more than a request for an amount of power. Indeed, a particular tapping device may also include, in the extension packet, an indication of a number of nodes behind the particular tapping device, downstream. The extension packet may also include a request message identifying the sender of the extension packet as a tapping device. Such a request message may be particularly useful when the sender of the extension packet is negotiating for power from an upstream device. In a preferable embodiment, the request message includes an identification of the number of downstream tapping devices behind the sender of the request message.

In FIG. 4, the third complex ID 400C negotiates with the PD 24. The third complex ID 400C may determine, on the basis of the absence of a request message identifying the sender of the extension packet as a tapping device, that the PD 24 is not a tapping device. In such a case, the third complex ID 400C transmits an extension packet to the second complex ID 400B. According to aspects of the present application, the extension packet includes: a power request; an indication that the third complex ID 400C is a tapping device (this may be implied); and an indication that the third complex ID 400C has no tapping devices behind it.

The second complex ID 400B receives the extension packet, preferably takes note of the power request on the port to the third complex ID 400C and a power request on the port to the second dependent powered device 424B. The second complex ID 400B notes that the port to the second dependent powered device 424B does not support a tapping device. The second complex ID 400B transmits an extension packet to the first complex ID 400A. According to aspects of the present application, the extension packet includes: a power request; an indication that the second complex ID 400B is a tapping device (this may be implied); and an indication that the second complex ID 400B has one tapping device behind it.

The first complex ID 400A receives the extension packet, preferably takes note of the power request on the port to the second complex ID 400B and a power request on the port to the fourth complex ID 400D. The first complex ID 400A notes that the port to the fourth complex ID 400D supports a tapping device. The first complex ID 400A transmits an extension packet to the PSE 22. According to aspects of the present application, the extension packet includes: a power request; an indication that the first complex ID 400A is a tapping device (this may be implied); and an indication that the first complex ID 400A has three tapping device behind it.

As one alternative to transmitting, in the request message in the extension packet, an indication of a number of tapping devices behind the transmitter of the request message, the request message may, instead, include an indication of a number of powered devices behind the transmitter of the request message. In another alternative, the request message may include: an indication of a number of tapping devices behind the transmitter of the request message; and an indication of a number of powered devices behind the transmitter of the request message.

On the basis of additional information gained in the request messages received in extension packets from downstream devices, every tapping device is empowered to make an informed decision regarding a port to which to deny power, if the tapping device has multiple ports. For example, a tapping device may be configured to favor a port with a greater number of devices connected to the port downstream (the biggest branch). The switching processor 308 may determine a proportion of received power to provide to the dedicated device output port 305 and to the downstream port 304 based on the number of complex IDs that are downstream of the dependent device 324 and the number of simple IDs that are downstream of the dependent device 324.

Maintaining a focus, for the moment, on unidirectional upstream information, each tapping device may provide more information than simply one number for requested power and another number for number of downstream nodes. According to further aspects of the present application, the request message in the extension packet may include power topology information. Such power topology information may, for example, indicate downstream node distribution and power requested by each node. It should be clear that such an indication can be accomplished in a number of ways. In a simple implementation, each power request and node making the power request may be listed in a string, alongside a character indicating an identity of a branch on which the node may be found. The number of nodes may be omitted, since an indication of the number of nodes may be considered to be available implicitly, through a count of the number of entries in the string. Each tapping device may name its two branches "A" and "B" and name itself "I." The last tapping device may list power requirement as "I(1 W), A(2 W), B(5 W)." The next tapping device upstream from the last tapping device may list its two nodes as follows "1(1 W), A(5 W), B(I(1 W),A(2 W),B(5 W))" and so on. This is merely an example, as it should be clear that other data structures are possible. By storing this information, each node maintains a record of the downstream power topology. Consequently, ever more information is propagated upstream such that the PSE 22 eventually receives information regarding the power topology of the entire network of complex IDs.

Responsive to an event and according to a predefined rule, the PSE 22 may alter the power topology. Similarly, a given switching processor may also alter the power topology responsive to an event and according to a predefined rule.

A data topology may also exist, separate and independent of the power topology. In a manner similar to the manner in which power topology information is shared throughout a mesh of IDs, data topology information may also be shared.

It follows that each switching processor, such as the switching processor 308, in each device in the network is operable to act to switch (control the flow of) power and data independently.

Responsive to an event and according to a predefined rule, the PSE 22 may alter the data topology. Similarly, a given switching processor may also alter the data topology responsive to an event and according to a predefined rule.

According to further aspects of the present application, each node may be associated with a unique or semi-unique node identifier. A suitable example identifier is a Media Access Control (MAC) address. The node identifiers allow for referencing each node in a manner that is the same for every node.

Without node identifiers, referencing a downstream node may be considered complicated in that the downstream node will be represented differently at each intermediate node, since each intermediate node stores a distinct string. A reference to a node that is "the fourth node down from the root" may be considered ambiguous in a case wherein multiple branches lead away from the root. A reference to a node that is "the first node up from the leaf" may also be considered ambiguous for similar reasons. It follows that referring to a node by a unique identifier, with this unique identifier being stored as part of the topology information on each node, or at least on each node upstream of it, obviates the ambiguity.

Preferably, this information propagation occurs and is complete before tapping devices are granted the power they request. Such information propagation may be seen to involve the complex ID 300 operating in a mode wherein the switching processor 308 is powered. In such embodiments, the complex ID 300 may have a low-power discovery mode of operation in which the switching processor 308 uses only a small amount of power corresponding to what the switching processor 308 needs to operate and, in particular, to engage in power negotiation and to receive and propagate information. The discovery mode may be similar to the pass-through mode. For example, the complex ID 300 may request maximum power and grant downstream (e.g., half-half to both ports or so) all but what the switching processor 308 needs for its own low-power discovery mode.

Preferably, aspects of the present application relate to implementing, as an extension to existing protocols, an instruction message that provides instructions to tapping devices. The information may include: whether or not the tapping device has been granted power; and which port of the tapping device has been granted power. Clearly, the latter information is only pertinent if the tapping device is multi-port. Furthermore, the instruction message may specify a coordinated time for the switching processor 308 to commence providing power to the dependent device output port 305 or to commence providing power to the downstream output port 304. Various coordinated times may be staggered or offset to allow for a stable power draw.

Where the information in the instruction message includes an instruction indicating which port of the tapping device has been granted power, it may be considered that decision-making authority, regarding to which port to grant power, has been removed from the switching processor 308. Instead, instructions come from upstream, for example, the instructions may originate from the PSE 22.

According to aspects of the present application, the switching processor 308 may retain some limited decision-making logic. The switching processor 308 may employ the limited decision-making logic to handle, for example, situations wherein a received power is less than a negotiated power.

A situation is contemplated wherein a tapping device does not follow the instructions included in the instruction message in the extended packet. For example, instructions for the third complex ID 400C (FIG. 4) may indicate that no power is to be provided to the port to which is connected the third dependent powered device 424C. That is, the instructions for the third complex ID 400C may indicate that all power should be passed to the port to which the PD 24 is connected. Contrary to the instructions, the third complex ID 400C may provide power to the port to which is connected the third dependent powered device 424C.

To detect such a situation, the switching processor 308 of every complex ID 400 may be configured to recognize and record instructions being sent downstream. Through the recording, each switching processor 308 may manage a power granted to each complex ID 400 downstream. Consequently, each switching processor 308 may determine when an output port is drawing more power than has been granted. Responsive to the determining, the switching processor 308 may stop proving power on the output port that is drawing more power than has been granted to downstream complex IDs 400.

Notably, this approach benefits from a careful application. Indeed, in a haphazard application, an entire branch of complex IDs 400 may be denied power on the basis that a complex ID 400 at the end of the branch is drawing more power than has been granted. As such, the switching processor 308 that is preparing to stop proving power on the output port that is drawing more power than has been granted to downstream complex IDs 400 may, first, determine that there are no switching processors 308 downstream that have also detected the drawing of more power than granted. Such determining may be accomplished through request messages in the extension packet.

In those cases wherein each tapping device is either entirely granted power or entirely denied power, the information regarding whether or not a particular tapping device has been granted power may be implemented by merely instructing the upstream node to deny power to the port to which the particular tapping device is connected.

However, aspects of the present application are related to implementing tapping devices that have a pass-through mode. The tapping device in pass-through mode passes power (and, in at least some cases, data) downstream without providing any power for the dependent powered device associated with the tapping device. That is, if the tapping device in pass-through mode has a preferred "dedicated" port, the tapping device in pass-through mode does not provide any power to the "dedicated" port and, consequently, does not provide any power to the dependent powered device. The pass-through mode may be the default mode of operation for the tapping device.

According to aspects of the present application, the tapping device in pass-through mode is granted power ("internal power") to be able to monitor for any status changes. Indeed, the tapping device in pass-through mode may, at some later point in time, be allowed to leave pass-through mode and power up the device on the "dedicated" port, if the network power demands allow for such a mode change.

According to other aspects of the present application, the tapping device in pass-through mode is not granted power to be able to monitor for any status changes. The tapping device is merely allowed receive minimal power to connect an upstream port to an appropriate downstream port. Waking the tapping device from this mode may involve first, cutting the minimal power to the tapping device and second, restoring regular power to the tapping device such that the tapping device is caused to restart power negotiations with an upstream node.

According to other aspects of the present application, there are multiple pass-through modes. In a first pass-through mode, the tapping device is granted power to be able to monitor for any status changes. In a second pass-through mode, the tapping device is not granted power to be able to monitor for any status changes.

The pass-through modes may be considered to allow for a denial of power to devices mid-stream without causing a power outage for the devices on downstream branches. In the hallway powered lighting example discussed hereinbefore, the pass-through mode allows for turning off every second light (dependent powered device) responsive to a drop in available power. Such an approach contrasts with the approach wherein all lights are powered up to a point then no lights are powered after that point.

By including instructions for execution by specifically identified complex IDs 400, the PSE 22 may be empowered to control powering of all complex IDs 400 in a particular network. This control opens several possibilities.

For example, the PSE 22 may configure a specific start-up sequence. The PSE 22 may instruct a given complex ID to commence operation at a particular time. The instruction in the instruction message portion of the extension packet may indicate "start now," "commence operation in ten minutes" or "commence operation at 20:30:00." Accordingly, the PSE 22 can instruct all complex IDs to commence operation at the same time, for clocks or lights, for example. Alternatively, the PSE 22 can initiate a start-up sequence to specifically avoid all complex IDs commencing operation at the same time.

By controlling the start-up sequence, the PSE 22 may give switching processors 308 time to monitor power consumption. Through such monitoring, a given switching processor 308 may recognize that, on average, a dependent powered device 424 draws less power than has been requested and granted. Responsively, the switching processor 308, perhaps under instructions from the PSE 22, may reduce the power granted to the port to which the dependent powered device 424 is connected. Accordingly, wasted power allocation is avoided and the chances of powering every dependent powered device 424 are increased. This may be implemented as an adaptation of Autoclass under IEEE802.3bt. Monitoring at the switching processor 308 may include monitoring instruction, from the PSE 22, directed to the device connected to the downstream port 304 to, thereby, determine an amount of power allocated to the device connected to the downstream port 304. The switching processor 308 may determine, based on the instruction, that a power amount specified in an earlier-handled power request exceeds the amount of power allocated to the device connected to the downstream port 304. Responsive to the determining, the switching processor 308 may discontinue providing power to the downstream port 304.

Moreover, the PSE 22 may arrange a prioritization of dependent powered devices 424. A priority sequence or a prioritization algorithm may be implemented in the PSE 22. According to aspects of the present application, the PSE 22 may provide a user interface (e.g., a web interface) that presents a user with a visual representation of a network topology. The visual representation may include representations of available power and power requests at each node in the topology. Information about nodes in the network may be provided in the visual representation. By looking up a MAC addresses, a description of a type for the device associated with the MAC address may be obtained. Tapping devices may be identified as such. Icons may visually indicate types of devices. Names may be provided. The topology may be represented visually as a tree. A graphical user interface (GUI) device may allow a user to input a priority sequence for implementation by the PSE 22, e.g., by giving each node a priority number. Equal priority may be specified, in which case, a prioritization algorithm implemented by the PSE 22 may default to a second level of prioritization. The second level of prioritization may, e.g., be based on: the number of dependent nodes; power consumption (low to high or vice versa); or the type of the device. The visual representation may include an indication of prioritization for commencing operation to a particular dependent device over another dependent device Notably, instruction messages from the PSE 22 may be intercepted by a midstream tapping device and changed. Such interception may, on one hand, be undesirable. On the other hand, use cases are contemplated wherein a user may add a new complex ID in the middle of a daisy chain or network. Midstream instruction message interception and changing may be used to alter power grants and reorder prioritization for all devices downstream of the new complex ID. The interceptor need not be a new complex ID. Indeed, the switching processor 308 of the complex ID 300 may intercept an instruction from the PSE 22 directed to a downstream device, modify the instruction and transmit the instruction downstream.

According to aspects of the present application, a definition of the extension packet includes a format for the request message. The request message may be transmitted by a tapping device that has denied power to itself or has denied power to a downstream port. These request messages are expected to propagate upstream until the request messages reach the PSE 22. In simple examples, where decision-making power is not concentrated in the PSE 22, the request messages may be seen to allow for diagnosis of network problems. Such diagnosis may identify a location of a cut. In more advanced systems, wherein the PSE 22 instructs power denials, the request messages may be seen to provide useful confirmation of the execution of instructions. Furthermore, the request messages may also be useful in network error diagnosis. For example, the request messages may find use in determining that a complex ID was granted power but still found itself unable to service a downstream device.

In the preceding examples, sharing information from one complex ID to another complex ID has only been discussed in an upstream direction. It may be shown that upstream-only information sharing allows for a simple, robust and lean system. According to aspects of the present application information may be shared from one complex ID to another complex ID in a downstream direction. An adapted version of the request message described hereinbefore may be shared and propagated downstream as an instructions message. Downstream information sharing may be seen to be useful, for example, in a scenario wherein a dedicated network diagnosis device is placed somewhere in a network to analyze the network.

It is notable that the simple IDs 200 of FIG. 2 and the complex IDs 400 of FIG. 4 have been presented herein in homogenous daisy chains and networks. However, it should be clear that networks may include a mix of the simple IDs 200 and the complex IDs 400. A given ID may identify itself as a simple ID or a complex ID. Alternatively, each simple ID may be implemented in a manner similar to the manner in which complex IDs are implemented with the onboard device treated as a dependent powered device.

To this point, networks of IDs have been described either as a daisy chain configuration or a tree configuration. Notably, when IDs in one branch of a tree configuration connect to another branch of the same tree configuration, the IDs may be considered to be in a mesh configuration. Conveniently, the PSE 22 (or the switching processor 308) may use configuration instructions to a network of IDs in a mesh configuration to create one or more virtual circuits in the network.

Figure 5:
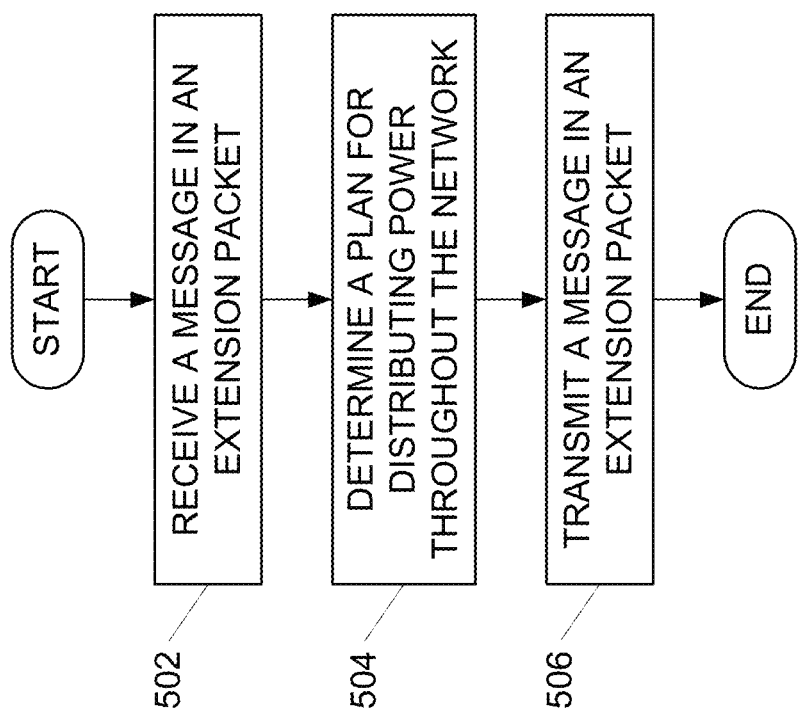
FIG. 5 illustrates example steps in a method of intelligent power distribution in accordance with aspects of the present application.

FIG. 5 illustrates example steps in a method of intelligent power distribution to be carried out at the PSE 22 in the context of a network of IDs that are operable to communicate using the request messages in the extension packets described herein. Initially, the PSE 22 receives (step 502) a request message in an extension packet. In accordance with aspects of the present application, the request message has contents that include a request for a specific amount of power and an indication of a topology for the network. The PSE 22 is operable to use the contents of the request message to determine (step 504) a distribution plan for distributing the available power throughout the network. Determining (step 504) the distribution plan may include forming an association between each device of a plurality of devices in the network and an amount of granted power. The PSE 22 may then implement the distribution plan by transmitting (step 506) an instruction message in an extension packet.

The method of intelligent power distribution, example steps of which are illustrated in FIG. 5, is indicated as being carried out at the PSE 22. However, in aspects of the present application, power information and commands may be signalled over higher layers of the data network, in which case, the method of intelligent power distribution need not be carried out exclusively by the PSE 22. A sophisticated intermediary device could manage power use downstream in the manner illustrated in FIG. 5. Given the bidirectional flow of data, such a sophisticated intermediary device could manage power use upstream, as well.

It is expected that the switching processor 308 of the complex ID 300 is configured to determine a total power request based on power requirements of the switching processor 308, a power request received from the dependent powered device 324 and from a device connected to the downstream port 304 when determining a total power to request.

It is expected that simple IDs are able to determine a power request from their dependent powered device when determining a total power to request. Accordingly, it is expected that simple IDs will fit well into a network that operates with extension packets as described in aspects of the present application.

It follows that, when a legacy device is added to the network and the legacy device does not support extension packets described herein, the legacy device will be treated, by complex IDs, as a powered device. Treating a legacy device in this way may be shown to render opaque every device downstream of the legacy device. The legacy device may be seen to interrupt intelligent power distribution for the legacy device and every device downstream of the legacy device. However, the remainder of the network may be allowed to continue to employ intelligent power distribution.

In aspects of the present application, the messaging described herein is carried out using a transport layer protocol, like LLDP. Use of a transport layer protocol for messaging may be considered unique in power management.

Figure 6:
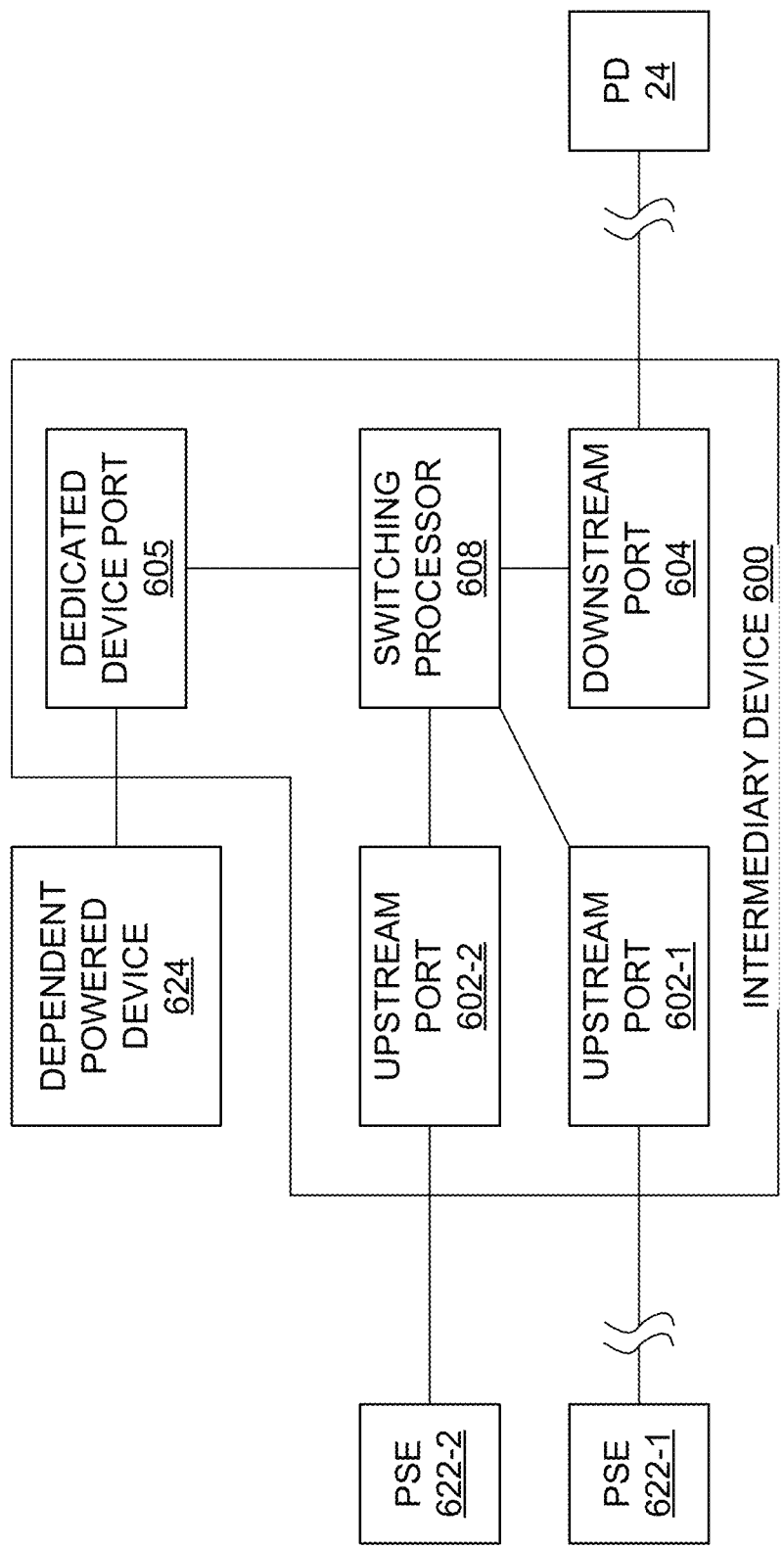
FIG. 6 illustrates a multi-input complex ID with connections for receiving power and data from a first PSE and a second PSE in accordance with aspects of the present application.

In aspects of the present application, a complex ID may receive power from multiple PSEs to provide more power downstream or to itself. FIG. 6 illustrates a multi-input complex ID 600 with connections for receiving power and data from a first PSE 622-1 and a second PSE 622-2 and providing power downstream to the PD 24. The multi-input complex ID 600 is associated with a dependent powered device 624 component. The multi-input complex ID 600 includes a first upstream port 602-1 for receiving power and data from the first PSE 622-1 and a second upstream port 602-2 for receiving power and data from the second PSE 622-2. Furthermore, the multi-input complex ID 600 includes a downstream port 604 for connecting to the PD 24, or for connecting to another ID in a network or daisy chain configuration. Since the multi-input complex ID 600 is associated with the dependent powered device 624, a dedicated device port 605 is included in the multi-input complex ID 600. Each of the four ports 602-1, 602-2, 604, 605 is connected through a switching processor 608.

It should be clear that the multi-input complex ID 600 may be incorporated into a network that includes simple IDs 200 and single-input complex IDs 400.

Notably, although only two PSEs 622 are illustrated, with corresponding upstream input ports 602, it is contemplated that many more than two PSEs may connect to a multi-input complex ID. Moreover, the second PSE 622-2 need not be a source of data. Indeed, the second PSE 622-2 may be implemented as part of a solar panel, a battery or other data-free power source. Conveniently, the additional power supplied by a data-free second PSE 622-2 may allow more powered devices to be turned on than might be the case in the absence of the data-free second PSE 622-2. Through execution of a specific algorithm, the switching processor 608 may determine a quantity of electrical power to draw from the first upstream port 602-1 and the second upstream port 602-2. Proportions of the electrical power drawn from the first upstream port 602-1 and the second upstream port 602-2 may be provided to the dedicated device port 605 and/or the downstream port 604 and may be used for operation the switching processor 608. The switching processor 608 may execute an algorithm to determine a quantity of electrical power to draw from the first upstream port 602-1 and the second upstream port 602-2 and to determine a proportion of the drawn electrical power to provide to the dedicated device port 605 and the downstream port 604 and for operation the switching processor 608.

It has been discussed hereinbefore that the switching processor 308 is configured to receive a dependent device power request, determine a total power request including the power for operation of the switching processor 308 and power specified in the dependent device power request and transmit, upstream, the total power request. Notably, the switching processor 308 may include, in the total power request, only a portion of the power specified in the dependent device power request. Similarly, the switching processor 308 may receive a downstream device power request, wherein the total power request includes the downstream device power request. The switching processor 308 may include, in the total power request, only a portion of the power specified in the downstream device power request.

In certain instances, an ID may exploit IEEE802.3bt to represent, by dual signature, the requirements of two downstream devices, such as the dependent powered device 324 and the PD 24.

To handle distribution of the news of the availability of additional power, an additional power message may be defined to be carried in the extension packet. The additional power message may indicate the amount of additional power being added on the line. Receipt of an additional power message may allow the first PSE 622-1 to make more informed determinations (see step 504, FIG. 5).

Figure 7:
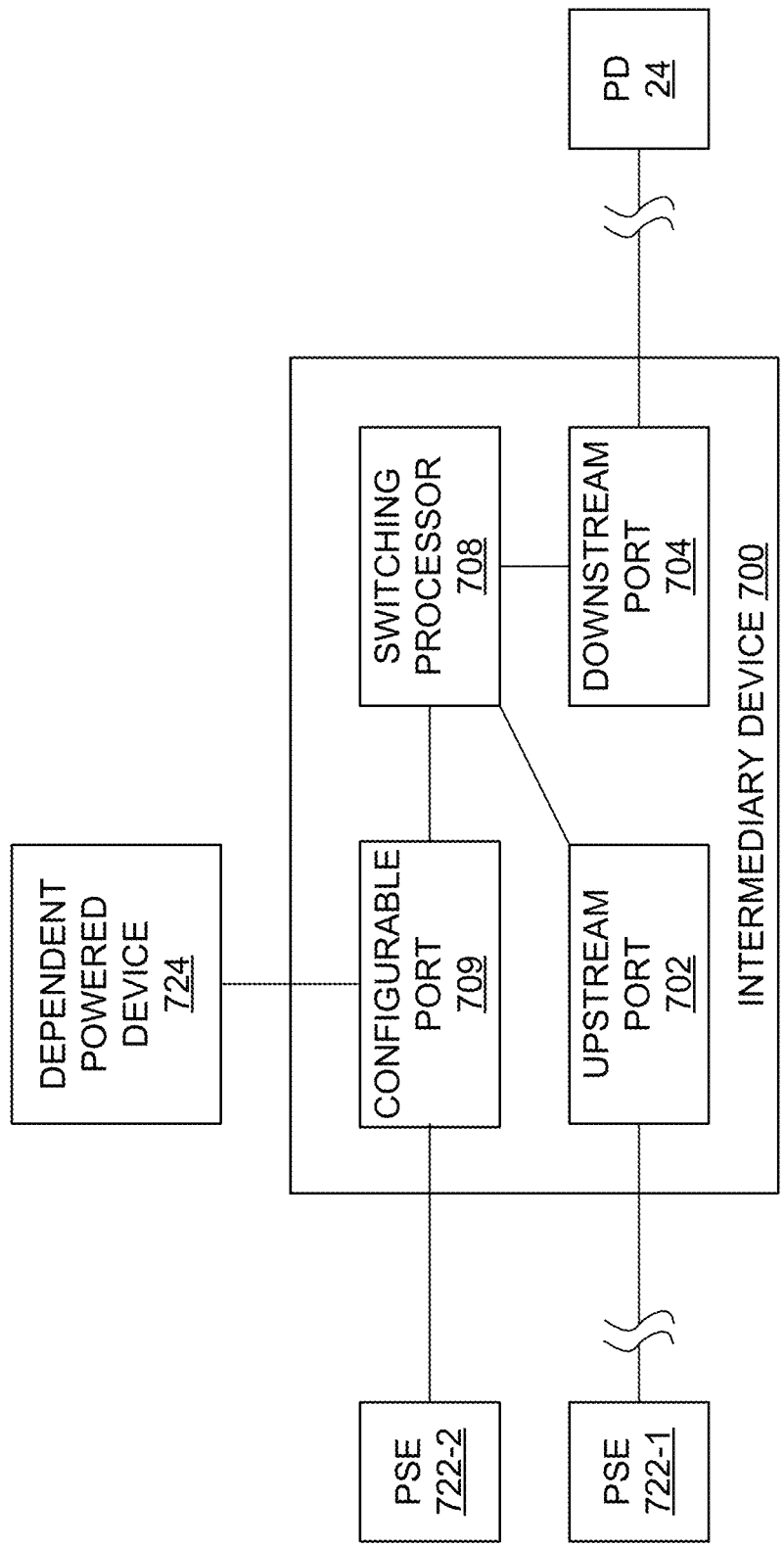
FIG. 7 illustrates a dichogamous complex ID with connections for receiving power and data from a first PSE and a second PSE in accordance with aspects of the present application.

FIG. 7 illustrates a dichogamous complex ID 700 with connections for receiving power and data from a first PSE 722-1 and a second PSE 722-2 and providing power downstream to the PD 24. The dichogamous complex ID 700 is associated with a dependent powered device 724 component. The dichogamous complex ID 700 includes an upstream port 702 for receiving power and data the first PSE 722-1 and a configurable port 709 for receiving power and data from the second PSE 722-2. Furthermore, the dichogamous complex ID 700 includes a downstream port 704 for connecting to the PD 24, or for connecting to another ID in a network or daisy chain configuration. The dependent powered device 724 connects to the configurable port 709. Each of the three ports 702, 709, 704 is connected through a switching processor 708.

In operation, and upon receiving a reconfiguration instruction from the switching processor 708, the configurable port 709 may switch between operating like the second upstream port 602-2 of FIG. 6 and operating like the dedicated device port 605 of FIG. 6 or vice versa. When operating like the second upstream port 602-2 of FIG. 6, the configurable port 709 may receive power and data from the second PSE 722-2 and pass the power and data to the switching processor 708. When operating like the dedicated device port 605 of FIG. 6, the configurable port 709 may be assigned by the switching processor 708 to receive power and pass the power to the dependent powered device 724. Conveniently, providing a two-direction port, such as the configurable port 709, allows for a collection of interconnected IDs to take on a more network-like topology than would otherwise be possible.

Figure 8:
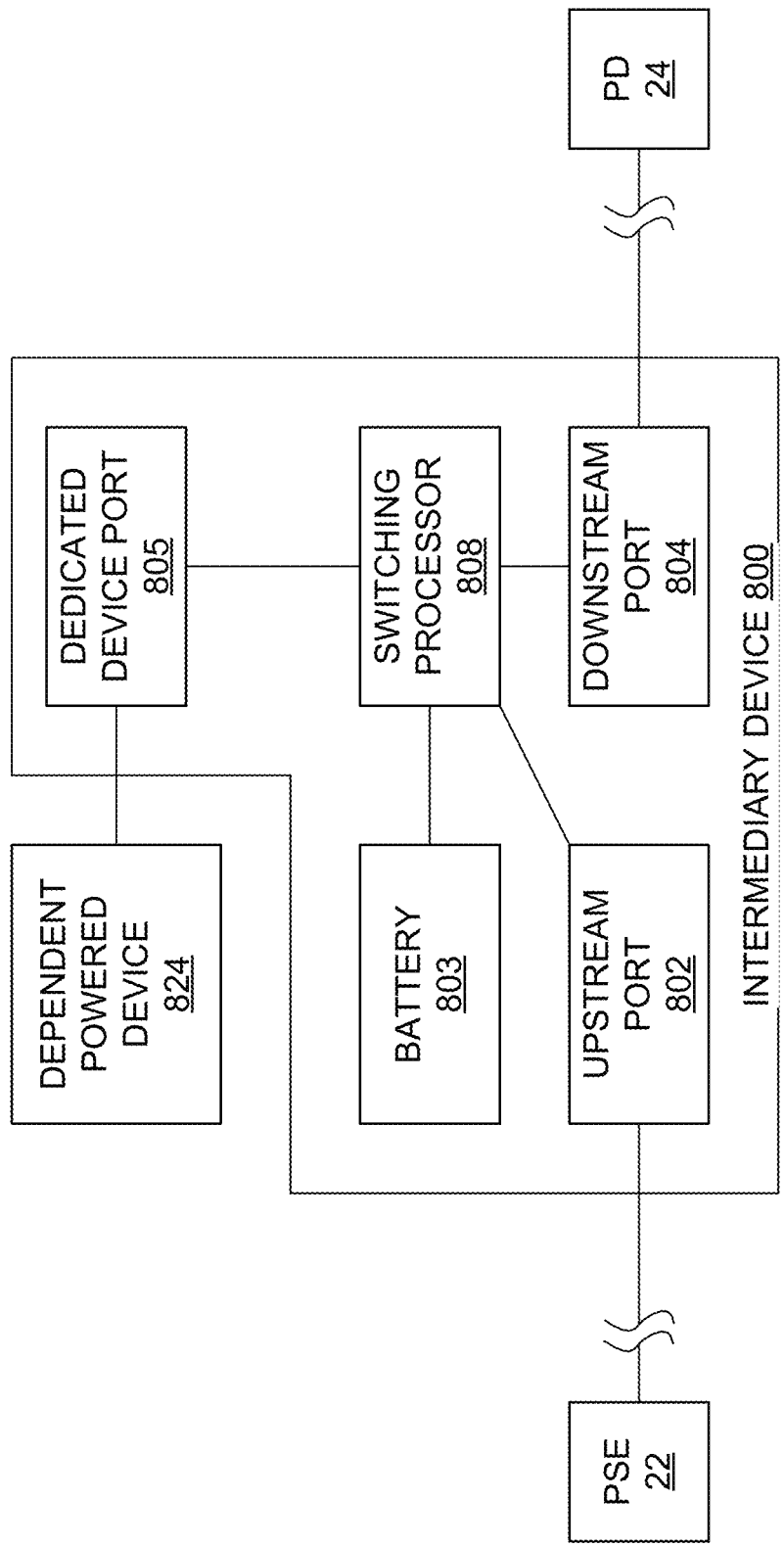
FIG. 8 illustrates a battery-inclusive complex ID with a battery and connections for receiving power and data from the PSE in accordance with aspects of the present application.

In aspects of the present application, a complex ID may incorporate a battery. FIG. 8 illustrates a battery-inclusive complex ID 800 with connections for receiving power and data from the PSE 22 and providing power downstream to the PD 24. The battery-inclusive complex ID 800 is associated with a dependent powered device 824 component. The battery-inclusive complex ID 800 includes an upstream port 802 for receiving power and data the PSE 22. The battery-inclusive complex ID 800 also includes a battery 803. Furthermore, the battery-inclusive complex ID 800 includes a downstream port 804 for connecting to the PD 24, or for connecting to another ID in a network or daisy chain configuration. Since the battery-inclusive complex ID 800 is associated with the dependent powered device 824, a dedicated device port 805 is included. The battery 803 and each of the three ports 802, 804, 805 are connected through a switching processor 808. Notably, the battery 803 may be implemented as a known lithium ion battery or an ultracapacitor, just to name two possibilities for power storage. The battery 803 may need to be replaced when the charge has diminished or may be rechargeable.

The battery-inclusive complex ID 800 may employ power from the battery 803 to deal with a spike in power draw at the output port 804. Additionally, with power available from the battery, the battery-inclusive complex ID 800 reduce the amount of power requested. The battery-inclusive complex ID 800 may use 5 W on average but occasionally spikes, temporarily, to 20 W. The battery 803 of the battery-inclusive complex ID 800 may allow the device to merely request, say, 6 W or 7 W instead of 20 W. The excess of 1 W or 2 W may be directed, by the switching processor 808, towards charging the battery 803. Bolstering the power available at the output port 804 with a battery power may be seen to allow the battery-inclusive complex ID 800 to handle spikes in power draw that were not anticipated, based on any monitoring of power flow in which the battery-inclusive complex ID 800 may have engaged.

Figure 9:
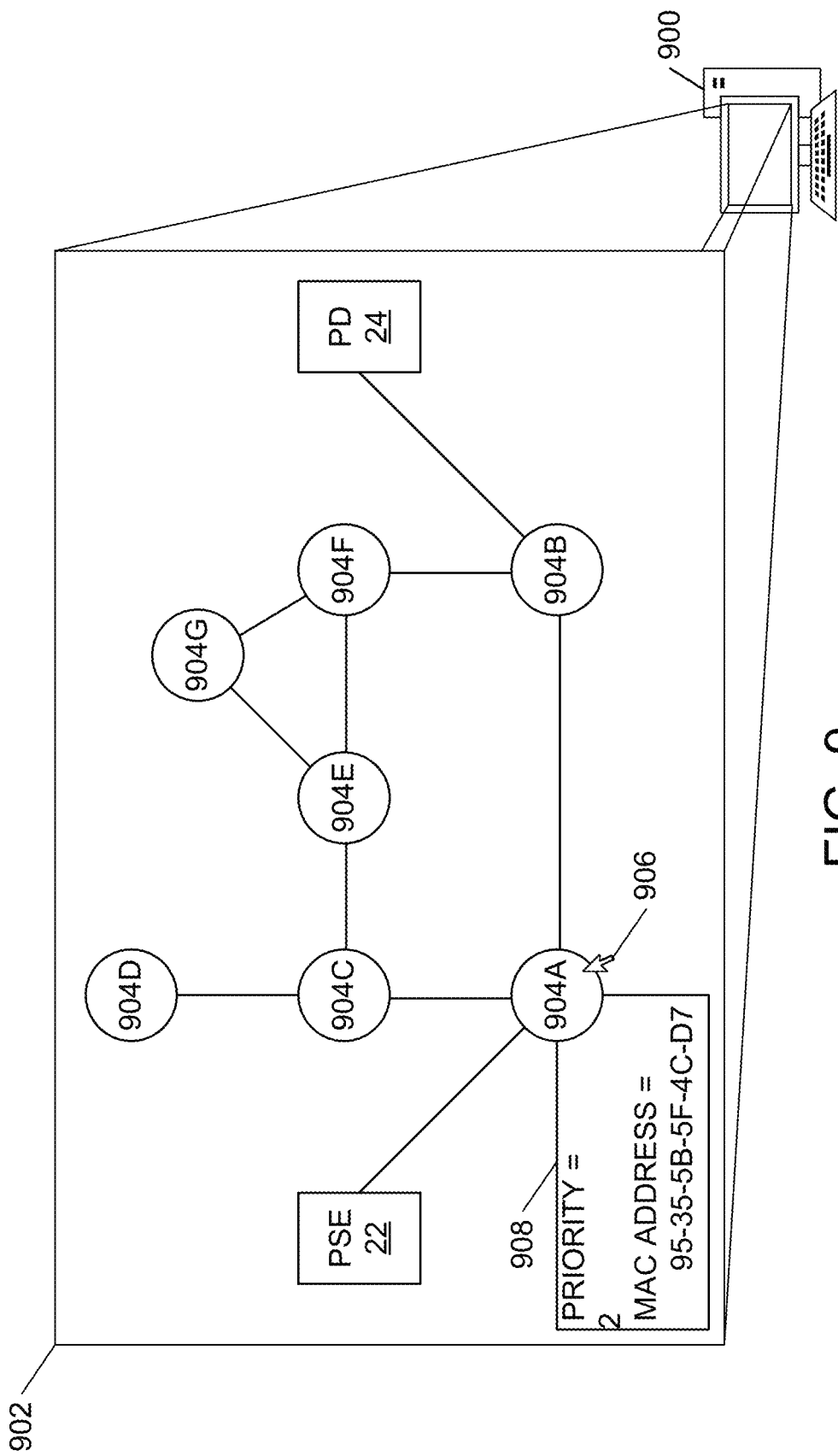
FIG. 9 illustrates a display of a graphical user interface device in accordance with aspects of the present application.

FIG. 9 illustrates a display 902 of a graphical user interface (GUI) device 900, which, as mentioned hereinbefore, may allow a user to input a priority sequence for implementation by the PSE 22, e.g., by giving each node a priority number. The display 902 of FIG. 9 illustrates a representation of a network of IDs as a topology of nodes 904A, 904B, 904C, 904D, 904E, 904F, 904G (collectively or individually 904) and connections between the nodes 904. A cursor 906 is illustrated as positioned over one of the nodes 904A. Responsive to the user positioning the cursor 906 over the node 904A, the GUI device 900 may cause a dialog 908 to appear on the display 902. Example information that may be conveyed in the dialog 908 include a priority number and a MAC address. Further information (not shown) in the dialog 908 may relate to control power routing decisions.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. An intermediary device (ID) configured to be connected between a power sourcing equipment (PSE) and a powered device (PD), the ID comprising:
   an upstream port configured to receive a first amount of power from a device in an upstream direction, the upstream direction defined as from the ID toward the PSE;
   a downstream port configured to supply a second amount of power to one or more additional IDs located in a downstream direction from the ID, the downstream direction defined as from the ID toward the PD;
   an output port configured to supply a third amount of power to a dependent device; and
   a switching processor configured to determine the second and third amount of power to power up the one or more additional IDs and the dependent device respectively; and
   wherein the one or more additional IDs differ from the dependent device in that each additional ID is configured with a power tapping ability such that the one or more additional IDs are interconnected to form a power routing topology in the downstream direction.

2. The ID of claim 1, wherein the power routing topology includes a daisy chain configuration, a tree configuration, or a mesh configuration.

3. The ID of claim 1, wherein the switching processor is configured to have at least a first mode in which the switching processor is configured to pass power through the one or more additional IDs in the downstream direction without providing power to the dependent device.

4. The ID of claim 1, wherein the one or more additional IDs within the power routing topology are selectively powered up.

5. The ID of claim 1, wherein the dependent device has a priority that is higher than that of each of the one or more additional IDs.

6. The ID of claim 1, the switching processor is further configured to:
   initially negotiate an amount of power from the device, wherein the amount of power is a maximum available power from the PSE; and
   fine tune the negotiated amount of power based on power amount requested from the one or more additional IDs and the dependent device.

7. The ID of claim 6, wherein the maximum amount of power is initially negotiated via a link layer discovery protocol (LLDP).

8. The ID of claim 1, wherein the dependent device includes a light.

9. The ID of claim 1, wherein the switching processor is further configured to route data and power independently.

10. The ID of claim 1, wherein the ID further comprises another upstream port configured to receive a fourth amount of power from another device in the upstream direction.

11. An intermediary device (ID) configured to be connected between a power sourcing equipment (PSE) and a powered device (PD), the ID comprising:
    an upstream port configured to receive a first amount of power from a device in an upstream direction, the upstream direction defined as from the ID toward the PSE;
    a downstream port configured to supply a second amount of power to one or more additional IDs located in a downstream direction from the ID, the downstream direction defined as from the ID toward the PD;
    an input port configured to receive a third amount of power from a power; and
    a switching processor configured to determine the second amount of power to power up the one or more additional IDs respectively; and
    wherein each additional ID is configured with a power tapping ability such that the one or more additional IDs are interconnected to form a power routing topology in the downstream direction.

12. The ID of claim 11, wherein the power routing topology includes a daisy chain configuration, a tree configuration, or a mesh configuration.

13. The ID of claim 11, wherein the one or more additional IDs within the power routing topology are selectively powered up.

14. The ID of claim 11, wherein the ID further comprises an output port configured to supply a fourth amount of power to a dependent device.

15. The ID of claim 14, wherein the switching processor is configured to have at least a first mode in which the switching processor is configured to pass power through the one or more additional IDs in the downstream direction without providing power to the dependent device.

16. The ID of claim 14, wherein the dependent device has a priority that is higher than that of each of the one or more additional IDs.

17. The ID of claim 14, wherein the dependent device includes a light.

18. The ID of claim 11, the switching processor is further configured to:

initially negotiate an amount of power from the device, wherein the amount of power is a maximum available power from the PSE; and fine tune the negotiated amount of power based on power amount requested from the one or more additional IDs.

19. The ID of claim 18, wherein the maximum amount of power is initially negotiated via a link layer discovery protocol (LLDP).

20. The ID of claim 11, wherein the switching processor is further configured to route data and power independently.

21. A power routing topology connecting a power sourcing equipment (PSE) to a powered device (PD), the power routing topology comprising:

a plurality of intermediate devices (IDs), wherein each ID is configured with a power tapping ability such that each ID is configured to be interconnected with another ID located in a downstream direction from the ID, the downstream direction defined as from the ID toward to the PD; and one or more dependent device each configured to be connected to a corresponding ID;

wherein each ID is configured to route power to a corresponding dependent device and/or the other ID.

22. The power routing topology of claim 21 including a daisy chain configuration, a tree configuration, or a mesh configuration.

23. The power routing topology of claim 21, wherein the plurality of IDs are selectively powered up.

24. The power routing topology of claim 21, wherein each ID is configured to route data and power independently.

25. The power routing topology of claim 21, wherein one of the plurality of IDs is configured to:

initially negotiate an amount of power from the PSE, wherein the amount of power is a maximum available power from the PSE; and fine tune the negotiated amount of power based on power amount requested from IDs located in the downstream direction and/or the corresponding dependent device.

26. The power routing topology of claim 25, wherein the maximum amount of power is initially negotiated via a link layer discovery protocol (LLDP).

27. The power routing topology of claim 25, wherein each ID is configured to have at least a first mode in which the ID is configured to pass power through IDs in the downstream direction without providing power to the corresponding dependent device.

* * * * *